United States Patent [19]

Miyauchi et al.

[11] Patent Number: 4,617,486
[45] Date of Patent: Oct. 14, 1986

[54] MINIATURE D.C. MOTOR WITH IMPROVED TERMINAL PLATE AND BRUSHES

[75] Inventors: Tetsuro Miyauchi; Koji Niino, both of Miyazaki, Japan

[73] Assignee: S. M. C. Co., Ltd., Osaka, Japan

[21] Appl. No.: 725,207

[22] Filed: Apr. 19, 1985

[30] Foreign Application Priority Data

Apr. 19, 1984 [JP] Japan ............ 59-56673[U]
Apr. 19, 1984 [JP] Japan ............ 59-56674[U]

[51] Int. Cl.$^4$ ............ H02K 13/00
[52] U.S. Cl. ............ 310/233; 310/40 MM; 310/246
[58] Field of Search ............ 310/40 MM, 42, 89, 238, 310/239, 240, 242, 245, 246, 249; 29/597

[56] References Cited

U.S. PATENT DOCUMENTS

| 2,283,808 | 5/1942 | Humphrey | 310/235 |
| 3,234,417 | 2/1966 | Somers et al. | 310/154 |
| 3,433,989 | 3/1969 | Leavitt | 310/239 |
| 3,532,914 | 10/1970 | Chang et al. | 310/240 |
| 4,500,804 | 2/1985 | Akiyama | 310/40 MM |

FOREIGN PATENT DOCUMENTS

| 2301216 | 7/1974 | Fed. Rep. of Germany | 310/89 |
| 125068 | 9/1980 | Japan | 310/40 MM |
| 1588539 | 4/1981 | United Kingdom | 310/239 |

Primary Examiner—Patrick R. Salce
Assistant Examiner—D. L. Rebsch
Attorney, Agent, or Firm—Price, Gess & Ubell

[57] ABSTRACT

A miniature D.C. motor for a toy allows the arrangement of a brush base in a housing of the motor to be readily and positively positioned to improve the manufacturing efficiency of the motor and to ensure the actuation of the motor without trouble for a long period of time.

The motor includes a housing, a brush base which holds brushes therein and which detachably fits in the housing, and a detachable connection member for permitting a connection between the housing and the brush base. A motor further includes a commutator having an outer end formed into a truncated conical shape, wherein the brushes each are provided with a contact section having a convexly curved surface, to allow the outer end of the commutator to be pressedly interposed between the convexly curved surfaces of the brushes.

20 Claims, 9 Drawing Figures

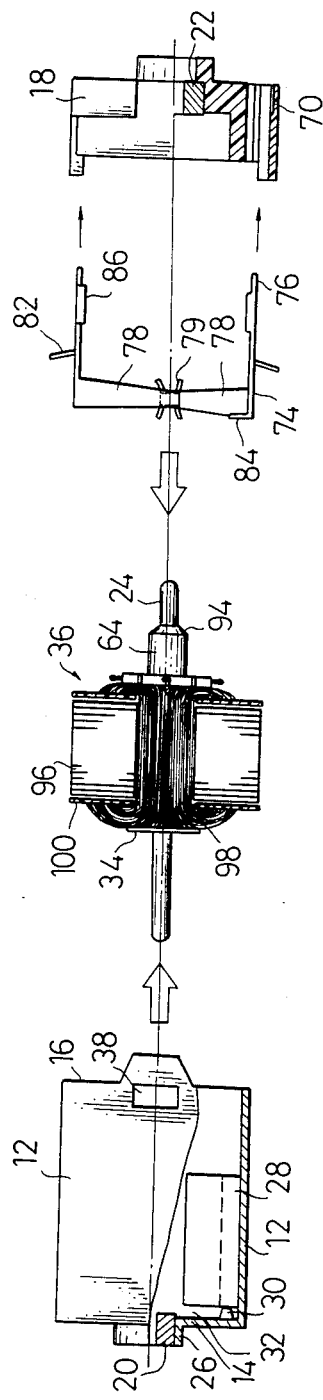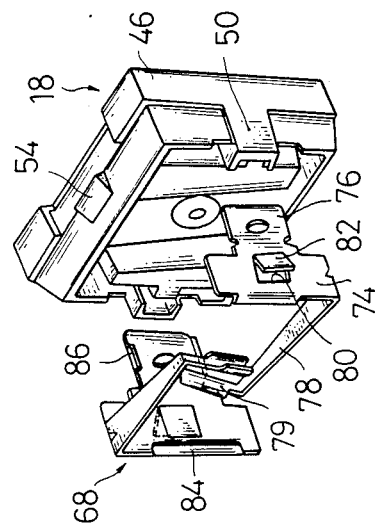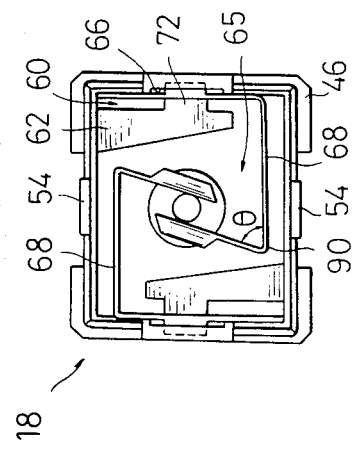

4,617,486

MINIATURE D.C. MOTOR WITH IMPROVED TERMINAL PLATE AND BRUSHES

BACKGROUND OF THE INVENTION

1. Field of the Invention

This invention generally relates to an improvement in a miniature D.C. motor, and more particularly to a miniature D.C. motor for a toy having an improved brush and terminal plate configuration.

2. Description of the Prior Art

There have been proposed and used various types of miniature D.C. motors for toys, particularly, vehicle toy. However, the conventional miniature D.C. motors each have a disadvantage in that the connection and arrangement of the brush base with respect to the housing of the motor is substantially troublesome, resulting in the manufacturing efficiency of the motor being significantly deteriorated.

Further, each of such conventional miniature D.C. motors fails to take the configuration and/or structure of a brush into full consideration. This causes the manufacturing efficiency of the motor to be reduced because the placement of the brush in the motor requires much time and labor. Also, this causes another disadvantage of decreasing the operating efficiency of the motor because of promoting damage and/or wear of the brush and causing an increase in frictional resistance of the brush.

SUMMARY OF THE INVENTION

The present invention has been made in view of the foregoing disadvantages of the prior art.

In accordance with the present invention, there is provided a miniature D.C. motor comprising a housing for receiving a motor body of the motor therein; a brush base for holding brushes therein, the brush base being detachably fitted with respect to the housing; and detachable connection means adapted to carry out the detachable fitting between the housing and the brush base.

In accordance with the present invention, there is also provided a miniature D.C. motor comprising a housing for receiving a motor body of the motor therein, the housing being formed into a substantially rectangular shape; a brush base formed into a substantially rectangular shape and adapted to be detachably fitted in the housing, the brush base having a peripheral wall that is tapered off to facilitate the fitting between the housing and the brush base; detachable connection means adapted to carry out the detachable fitting between the housing and the brush base; a pair of brushes arranged in the brush base, the brushes each comprising a plate brush and having at least a terminal section. The brush base is provided therein with brush guide grooves and brush guide projections opposite to each other; the brush base being formed with through-holes each of which allows the terminal section of the brush to outward extend therethrough when the brush is arranged in the brush base. The brush base is further provided therein with engagement means which are engaged with fixed means of the brushes to securely hold the brushes in the brush base; the brush base being provided therein with positioning means for holding the brushes at a position deviated at an angle of 180° from each other about the longitudinal axis of the motor.

Further, there is provided a miniature D.C. motor comprising a housing for receiving a motor body therein; a brush base adapted to be detachably fitted with respect to the housing; a pair of brushes arranged in the brush base, the brushes each including a contact section which has a convexly curved surface; detachable connection means adapted to carry out the detachable fitting between the housing and the brush base; and a commutator having an outer end formed into a truncated conical shape so as to be pressedly interposed between the convexly curved surfaces of the brushes.

Still further, there is provided a miniature D.C. motor comprising a housing for receiving a motor body therein, the housing being formed into a substantially rectangular shape; a brush base formed into a substantially rectangular shape and adapted to be detachably fitted in the housing, the brush base having a peripheral wall tapered to facilitate fitting between the housing and the brush base; detachable connection means adapted to carry out the detachable fitting between the housing and the brush base; a pair of brushes arranged in the brush base and each comprising a plate brush which has at least a terminal section, a base section and a contact-section, the contact section having a convexly curved surface; and a commutator having an outer end formed into a truncated conical shape which is pressedly interposed between the convexly curved surfaces of the contact sections of the brushes. The brush base is provided therein with brush guide grooves and brush guide projections opposite to each other and the brush base is formed with through-holes each of which allows the terminal section of the brush to outward extend therethrough when the brush is arranged in the brush base. The brushes are each provided at the base section thereof with a tongue-like projection which is engaged with a depression provided at the brush base to securely hold the brush in the brush base and the brush base is provided therein with positioning means for holding the brushes at the positions deviated at an angle of 180° from each other about the longitudinal axis of the motor.

Furthermore, there is provided a miniature D.C. motor comprising brushes each being provided with a contact section which has a convexly curved surface; and a commutator having an outer end formed into a truncated conical shape to be pressedly interposed between the convexly curved surfaces of the brushes.

Accordingly, it is an object of the present invention to provide a miniature D.C. motor which is capable of allowing the connection and arrangement of a brush base with respect to a housing of the motor to be readily carried out, to significantly improve the manufacturing efficiency of the motor.

It is another object of the present invention to provide a miniature D.C. motor in which a brush configured to exhibit a satisfied function is incorporated.

It is a further object of the present invention to provide a miniature D.C. motor which is capable of facilitating the arrangement of a brush in the motor so that the motor may be readily manufactured without any trouble and positively actuated for a long period of time without trouble.

Still other objects of the present invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which like reference numerals designate like parts throughout, wherein:

FIG. 2 is an exploded plan view partly in section of the miniature D.C. motor of FIG. 1 which illustrates a manner of assembling the motor;

FIG. 5 is a schematic view showing the inside or inner structure of a brush base incorporated in the motor of FIG. 1, wherein brushes are arranged in the brush base;

FIG. 6 is an exploded perspective view of a brush base incorporated in the motor of FIG. 1 which shows a state that brushes are separated form the brush base;

DETAILED DESCRIPTION OF THE PREFERRED EMBODIMENT

Now, a miniature D.C. motor for a toy according to the present invention will be described hereinafter with reference to the accompanying drawings.

Generally, a miniature D.C. motor adapted to be attached to a travel toy is formed into a substantially cubic shape of which one side is about 1 cm in length.

Figure 1:
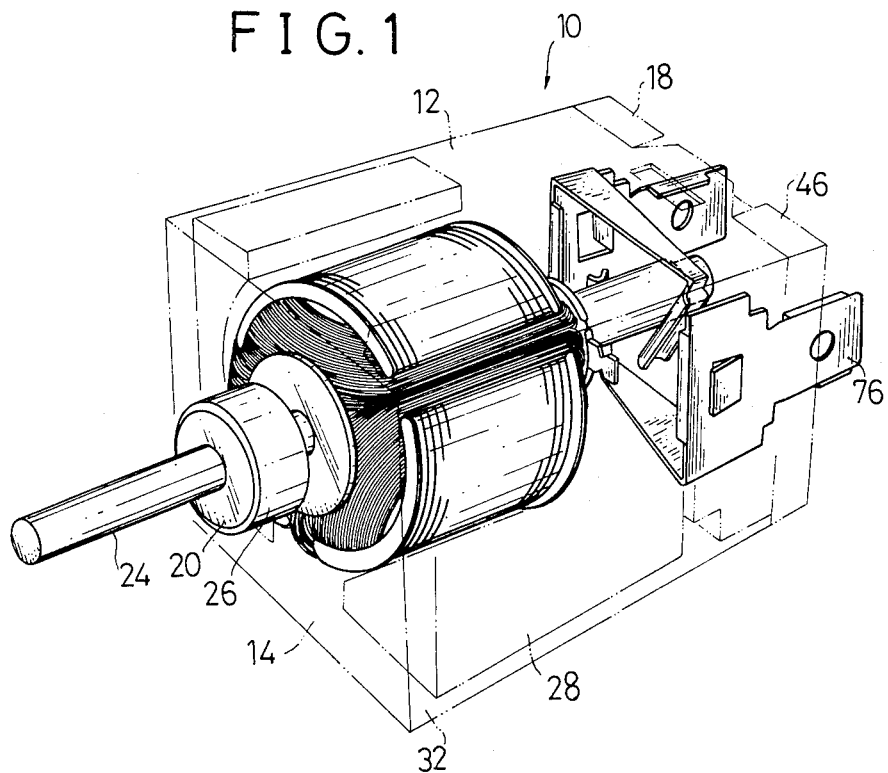
FIG. 1 is a schematic perspective view showing an embodiment of a miniature D.C. motor according to the present invention.

A miniature D.C. motor of the illustrated embodiment generally designated by reference numeral 10 in FIG. 1 includes a housing 12 formed into a generally rectangular shape, which is closed at one end 14 thereof and opened at the other end 16 thereof. The miniature D.C. motor 10 of the illustrated embodiment also includes a brush base 18 detachably connected or mounted with respect to the housing 12 through the open end 16. The closed end 14 of the housing 12 and the brush base 18 are respectively formed with through-holes in which bearing metals 20 and 22 are fixedly fitted to support a shaft 24 extending through the housing 12 and brush base 18. In the illustrated embodiment, the bearing metal 20 is arranged in the through-hole of the closed end 14 of the housing 12 through a holding ring 26 formed by outwardly pressing the closed end 14 of the housing 12.

The housing 12 is provided with a pair of magnets 28, which are fixedly arranged on the bottom surface thereof so as to serve as a stator. Between the closed end 14 of the housing 12 and the magnets 28 are interposed spacer means 30 as shown in FIG. 2, which, in the illustrated embodiment, are formed by inward pressing or projecting of four portions of the closed end 14 adjacent to the corner portions thereof in the direction in parallel to the shaft 24, to thereby define a clearance 32 at the portion of the interior of the housing 12 adjacent to the closed end 14. The clearance 32 allows the shaft 24 to be axially moved to decrease or substantially eliminate the abutment or contact between the bearing metal 20 and a thrust washer 34 of a rotor 36 (FIG. 2) of the motor. The thrust washer 34 is preferably formed of synthetic resin having lubricating properties.

The housing 12 is provided at the upper and lower walls of the open end 16 thereof with holes 38 and elastic tongue-like projections 40 outward extending, through which the brush base 18 is fittedly mounted with respect to the housing 12. The housing 12 is also formed at both sides of the open end 16 thereof with cutouts 42 for guiding and positioning the brush base 18 with respect to the housing 12 as described hereinafter.

The brush base 18 is formed into a generally rectangular cylindrical shape corresponding to the housing 12 and comprises a cap member formed of an insulating material such as synthetic resin. The cap member or brush base 18 is a substantially hollow body member 44 adapted to be fitted in the open end 16 of the housing 12 and a frame member 46 formed to be integral with the body member 44 and substantially surrounding the body member 44 and adapted to form an extension of the housing 12 when the brush base 18 is connected to the housing 12. The brush base 18 is formed with a pair of through-holes 48 extending in the axial direction thereof through which the terminal sections of brushes are inserted as described hereinafter.

Figure 7:
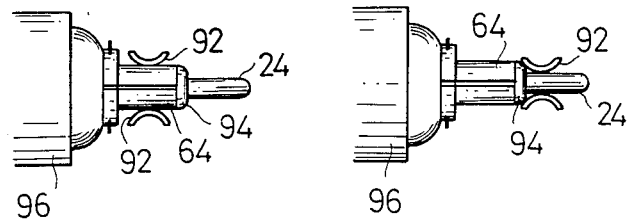
FIG. 7 is a partly enlarged view of a motor body of the motor shown in FIG. 1.
Figure 9:
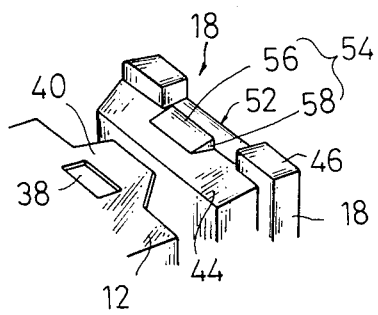
FIG. 9 is a schematic fragmentary perspective view showing a manner of connecting a brush base to a housing in the motor shown in FIG. 1.

The frame member 46 is formed on both sides of the base member 18 with a pair of locking projections 50 fitted in the cutouts 42 of the housing 12 and at the upper and lower portions thereof with recesses 52 to receive the tongue-like projections 40 of the housing 12 when the brush base 18 is connected to the housing. The body member 44 is provided at the upper and lower portions thereof with projections 54, which are securely and detachably fitted in the holes 38 of the housing 12 to detachably connect the brush base 18 to the housing 12. In the illustrated embodiment, the projections 54 each are formed into a pawl-like shape which has a slanting surface 56 which outwardly and upwardly extends to guide the tongue-like projection 40 of the housing 12 to carry out the connection between the housing 12 and the brush base 18 and vertical surfaces 58 for securely fitting the projection 54 in the hole 38 of the housing 12, as shown in FIG. 9. The substantially hollow body member 44 of the brush base 18 is formed therein with a pair of grooves 60 which communicate with the through-holes 48 of the brush base 18. In the illustrated embodiment, the grooves 60 are defined between the side walls of the body member 44 and projection wall members 62 provided in the body member 44 of the brush base 18 so as to serve as positioning means for holding the brushes in place in the brush base 18. Also, in the embodiment, the projection wall members 62 are deviated from each other at an angle of 180° about the axis of the brush base or motor, as shown in FIG. 5, and the grooves 60 are communicated also with a space 65 for receiving a commutator 64 (FIGS. 2 and 7) of the motor 10 described hereinafter therein.

Figure 4:
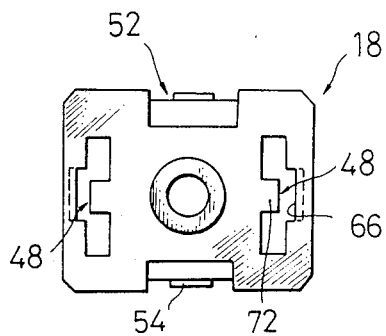
FIG. 4 is a schematic view showing the outside or outer structure of a brush base incorporated in the motor shown in FIG. 1.

The through-holes 48 of the brush base 18 each are formed at the inner surface thereof with a guide groove 66 (FIGS. 4 and 5) for guiding the insertion of a brush 68 described hereinafter in the brush base, a depression 70 (FIG. 2) engaged with the brush, and a guide projection 72 positioned opposite to the guide groove 66 to facilitate the insertion of the brush 68 in the brush base. In the illustrated embodiment, the guide groove 66 is formed to extend to the end of projection 50 of the body member 44 and the guide projection 72 is formed to extend to the end of the projection wall member 62. The guide projection 72 serves to facilitate the working of the brush 68 which has been securely inserted through the through-hole 48 by a mold pin and enlarge the surface area of the though-hole 11 to rapidly dissipate heat generated due to the operation of soldering a lead wire to the brush 68, so that the deformation of the brush base may be effectively prevented.

In the illustrated embodiment, each of the brushes 68 comprises a plate brush which is formed of a single metal sheet that is bent into a substantially L shape to have a base section 74, a terminal section 76 forwardly extending from the base section 74, an arm section 78 perpendicularly extending from the base section 74, and a convex brush contact section 79 provided at an acute angle to the end of the arm section 78 and adapted to the commutator 64.

The base section 74 of the brush 68 is adapted to be securely fitted in the groove 60 formed in the body member 44 of the brush base 18 and is formed with a U-shape cut 80 through which the terminal section 74 is connected to the base section 76. The U-shaped cut 80 is upwardly raised to form a tongue-like projection 82, which is securely engaged with the depression 70 of the brush base 18 when the brush is fitted in the brush base. Also, the base section 74 is provided with a force bearing member 84 which is formed by bending the bottom of the section 74 in the direction of the contact section and adapted to be pushed to effectively and safely carry out the insertion of the brush in the brush base.

The terminal section 76 of the brush 68 is outwardly outward extending from the base section 74, as shown in FIGS. 2 and 6, and is provided with inward projections 86 on the upper and lower sides of the portion thereof for outward projection from the brush base 18 when the brush is arranged in the brush base, which serves to reinforce the terminal section 76 and increase heat dissipation from the brush.

The arm section 78 of the brush 68 is formed of an outward tapered-off plate-like shape to have a straight portion 88 extending in the direction perpendicular to the base section 74 and a portion 90 bent to inward extend at an acute angle of $\theta$ from the straight portion 88.

The contact section 79 of the brush 68 is formed by curving or bending a plate member of a larger width provided at the end of the inward bent portion 90 of the arm section 78 so that the plate member has a semi-circular shape, a U-shape or the like in section to allow the contact portion 92 of the contact section 79 contacting the commutator 64 to have a convexly curved surface.

One pair of the brushes 68 is constructed in such a manner as described above, as shown in FIG. 5, and are arranged in the brush base 18 in a manner to be deviated at an angle of 180° from each other, so that the commutator 64 may be pressedly interposed between the convexly curved surfaces of the contact sections 79 and 79 by inserting the terminal sections 76 through the through-holes 48 of the brush base 18 and securely engaging the tongue-like projection 82 of the base section 74 with the depressions 70 of the brush base.

In the illustrated embodiment, the inwardly bent portion 90 of the arm section 78 is formed to extend at an acute angle $\theta$ from the straight portion 88. However, the portion 90 may be bent at an obtuse angle, as long as it is possible to lengthen the arm section 78 to a degree sufficient to obtain desired tension in such a state that the maximum thickness of the contact section is ensured, a compact configuration is provided for the brushes 68 in the brush base 18. In this instance, the straight portion 88 of the arm section is shortened as compared with that shown in FIG. 5.

It is preferable that a boss of the commutator 64 has an end 94 formed into a truncated conical shape to have a slant or curved surface which allows the surface of the commutator to smoothly reach to the surface of the shaft 24 and the insertion of the commutator 64 between the brushes can be readily carried out concurrently with the connection between the housing and the brush base and without any brush separation. In the illustrated embodiment, the commutator is formed into a cylindrical shape and fitted on the shaft 24, and has a terminal projected therefrom which is connected to an armature winding.

Figure 3:
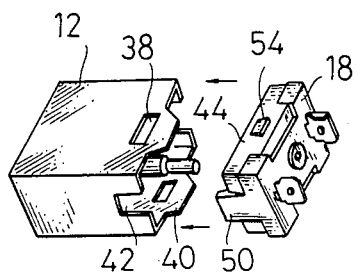
FIG. 3 is a perspective view showing a manner of connecting a brush base to a housing in the motor of FIG. 1.
Figure 8:
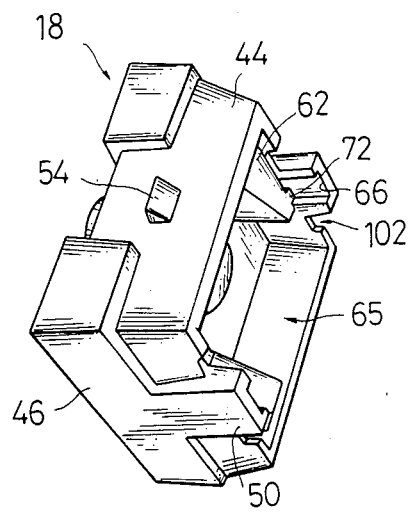
FIG. 8 is a perspective view of a brush base incorporated in the motor shown in FIG. 1.

In FIG. 3, reference numerals 96 and 98 designate a core and a winding, respectively. The core 96 is preferably formed to have a narrow width to allow the winding 98 to be wound thereon in large quantities. Reference numeral 100 indicate a core cover. Reference numeral 102 (FIG. 8) designates a cutout which serves to facilitate the fixedly arrangement of the brush in the brush base by means of a fixture.

The surface of each of the brushes 68 slidedly contacting with the commutator 64 is preferably coated with grease. It is preferable to form the elastic tongue-like projection so that it may have elasticity and/or flexibility sufficient to be somewhat outwardly expanded before the connection between the housing 12 and the brush base 18 and somewhat inwardly bent after the connection. Also, the body member 44 of the brush base 18 is preferably tapered off at the outer surface thereof and rounded off at the corner portions thereof so that the connection of the brush base 18 to the housing 12 may be readily carried out.

In the illustrated embodiment, the holes 8 and projections 54 are provided at the housing 12 and brush base 18, respectively. However, such provision of the holes and projections may be reversed.

Now, the manner of assembling of the miniature D.C. motor of the illustrated embodiment constructed as described above will be described with reference to the drawings.

First, the brushes 68 are fixedly arranged in the brush base 18 in the manner as described above. Then, the magnets 28 serving as a stator are securely arranged in the housing 12. At this time, the clearance 32 may be readily formed by the spacer means 30. Subsequently, the rotor assembly 36 is insertedly arranged in the housing 12 and the brush base 18 is fittedly connected to the housing, as shown in FIG. 2. The connection of the brush base 18 to the housing 12 may be readily accomplished by fitting the body member 44 of the brush base 18 in the open end 16 of the housing 12 while pressing the upper and lower walls of the body member 44 toward each other, to thereby fittingly engage the projections 54 of the body member 44 with the holes 38 of the housing 12. In this instance, the gap between the contact sections 79 and 79 of the brushes 68 and 68 is narrowly defined prior to the connection between the housing 12 and the brush base 18, however, the insertion of the commutator into the gap may be readily carried out due to the truncated conical end of the boss of the commutator 64 and the rounded contact portion 92 of the contact section of each brush 68 without carrying out the forcible separation of the brushes from each other.

Further, the contact portion 92 of the contact section 79 of the brush 68 is formed to have the convexly bent or curved surface, this significantly decreases the wearing of the contact section as compared with a flat plate-like brush.

It will thus be seen that the objects set forth above, among those made apparent from the preceding description, are efficiently attained and, since certain changes may be made in the above construction without departing from the spirit and scope of the invention, it is intended that all matter contained in the above description as shown in the accompanying drawings shall be interpreted as illustrative, and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A miniature D.C. motor comprising:
   a housing for receiving a motor body therein;
   a permanent magnet mounted in said housing;
   a rotor having a rotor shaft with a longitudinal axis rotatably mounted in said housing adjacent said permanent magnet;
   a brush base adapted to the detachable fitted with respect to said housing;
   a pair of brushes with support connections to said brush base arranged in said brush base, said brushes each including a contact section which has a convexly curved surface;
   detachable connections means adapted to carry out the detachable fitting between said housing and said brush base; and
   a commutator having an outer end formed into a truncated conical shape so as to be pressedly interposed between said convexly curved surfaces of said brushes, said brushes extending across said commutator with said support connection overlapping each other to provide a resilient contact with said curved surfaces of said brushes and said commutator.

2. A miniature D.C. motor as defined in claim 1, wherein said detachable connection means comprise projections provided at one of said housing and brush base and holes provided at the other of said housing and brush base.

3. A miniature D.C. motor as defined in claim 1, wherein said housing is formed into a substantially rectangular shape; and
   said brush base comprises an insulating cap member formed into a substantially rectangular shape, said brush base being formed therein with brush guide grooves and brush guide projections opposite to each other.

4. A miniature D.C. motor as defined in claim 1, wherein said brush base has a peripheral wall tapered to facilitate the fitting between said housing and said brush base.

5. A miniature D.C. motor as defined in claim 1, wherein said brush base is provided therein with engagement means which is adapted to be engaged with said brushes to hold said brushes in said brush base.

6. A miniature D.C. motor as defined in claim 1, wherein said brush base is formed with through-holes which allow sections of said brushes to outward extend therethrough when said brushes are arranged in said brush base to provide terminal sections.

7. A miniature D.C. motor as defined in claim 1, wherein said commutator is formed into a cylindrical shape and fitted on a shaft of said motor and has a terminal projected therefrom which is connected to an armature winding.

8. A miniature D.C. motor comprising:
   a housing for receiving a motor body of said motor therein, said housing being formed into a substantially rectangular shape;
   a permanent magnet mounted in said housing;
   a rotor having a rotor shaft with a longitudinal axis rotatably mounted in said housing adjacent said permanent magnet;
   a commutator having an outer end providing a sliding contact surface;
   a brush base member formed into a substantially rectangular shape and adapted to be detachably fitted in said housing, said brush base member having a peripheral wall tapered to facilitate a fitting connection between said housing and said brush base member;
   detachable connection means for connecting said housing and said brush base member;
   a pair of brush assemblies arranged in said brush base member, said brushes each comprising a plate brush and having at least a terminal section;
   said brush base member being provided therein with brush guide grooves and brush guide projections opposite to each other, said brush base member further being formed with through-holes, each of which allows a terminal section of said brush to extend outward therethrough when said brush is arranged in said brush base member;
   said brush base member being provided therein with engagement means which are engaged with said brushes to securely hold said brushes in said brush base member;
   said brush assemblies fixed to the housing and having brushes pressed into contact with the commutator, each brush assembly being formed from a flat metal plate and bent to provide a base plate for positioning in said brush base member, a cantilevered support member extending outward from an interior wall of said housing across said longitudinal axis to support said brushes, said brushes forming an acute angle with said support member and extending in a direction towards said base plate on the other side of said longitudinal axis of said rotor shaft from said base plate.

9. A small electrical motor comprising:
   a housing with interior walls;
   a permanent magnet mounted in the housing;
   a rotor having a rotor shaft with a longitudinal axis rotatably mounted in the housing adjacent the permanent magnet;
   a commutator having an outer end formed into a truncated conical shape fixed to the rotor, the conical shape providing a sliding contact surface;
   a plurality of brush assemblies fixed to the housing and having brushes pressed into contact with the commutator conical shape, each brush assembly being formed from a flat metal plate and bent to provide a base plate for positioning adjacent an interior wall and a cantilevered support member extending outward from the interior wall across the longitudinal axis to support the brushes, the brushes forming an acute angle with the support member and extending in a direction towards the base plate on the other side of the longitudinal axis of the rotor shaft from the base plate.

10. The invention of claim 9 wherein the housing member includes a snap mounted end wall base member with a pair of guide grooves extending substantially parallel to the longitudinal axis through the base member and the brush assemblies base members include a projection member for engagement with the guide grooves to secure the brush assemblies to the base member.

11. The invention of claim 10 further including a spacer member integrally formed on the interior wall of the housing member to position the permanent magnet.

12. The invention of claim 10 wherein each brush has a convex curved configuration for contact with the rotor commutator.

13. The invention of claim 11 further including snap mounting recesses and projections on respectively one of the housing member walls and the base member for interconnecting the base member with the housing member.

14. The invention of claim 12 wherein the base plate further includes a terminal section that extends exteriorly of the housing member through the guide grooves.

15. A small electrical motor comprising:
a housing with interior walls;
a permanent magnet mounted in the housing;
a rotor having a rotor shaft with a longitudinal axis rotatably mounted in the housing adjacent the permanent magnet;
a commutator having an outer end providing a sliding contact surface;
a plurality of brush assemblies fixed to the housing and having brushes pressed into contact with the commutator contact surface, each brush assembly being formed from a flat metal plate and bent to provide a base plate for positioning adjacent an interior wall and a cantilevered support member exending outward from the interior wall across the longitudinal axis to support the brushes, the brushes forming an acute angle with the support member and extending in a direction towards the base plate on the other side of the longitudinal axis of the rotor shaft from the base plate.

16. The invention of claim 15 wherein the housing member includes a snap mounted end wall base member with a pair of guide grooves extending substantially parallel to the longitudinal axis through the base member and the brush assemblies base members include a projection member for engagement with the guide grooves to secure the brush assemblies to the base member.

17. The invention of claim 16 further including a spacer member integrally formed on the interior wall of the housing member to position the permanent magnet.

18. The invention of claim 16 wherein each brush has a convex curved configuration for contact with the rotor commutator.

19. The invention of claim 17 further including snap mounting recesses and projections on respectively one of the housing member walls and the base member for interconnecting the base member with the housing member.

20. The invention of claim 18 wherein the base plate further includes a terminal section that extends exteriorly of the housing member through the guide grooves.

* * * * *